(12) United States Patent
Eriksson et al.

(10) Patent No.: US 9,398,592 B2
(45) Date of Patent: Jul. 19, 2016

(54) SCHEDULING APPARATUS AND METHOD FOR A TDD COMMUNICATION SYSTEM

(75) Inventors: Erik Eriksson, Linköping (SE); Bo Hagerman, Tyresö (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 174 days.

(21) Appl. No.: 14/236,334

(22) PCT Filed: Mar. 6, 2012

(86) PCT No.: PCT/EP2012/053817
§ 371 (c)(1),
(2), (4) Date: Mar. 26, 2014

(87) PCT Pub. No.: WO2013/017295
PCT Pub. Date: Feb. 7, 2013

(65) Prior Publication Data
US 2014/0293845 A1    Oct. 2, 2014

Related U.S. Application Data

(60) Provisional application No. 61/514,599, filed on Aug. 3, 2011.

(51) Int. Cl.
*H04J 3/00* (2006.01)
*H04W 72/04* (2009.01)
*H04W 8/08* (2009.01)

(52) U.S. Cl.
CPC .............. *H04W 72/048* (2013.01); *H04W 8/08* (2013.01); *H04W 72/0446* (2013.01)

(58) Field of Classification Search
CPC .............................. H04W 8/08; H04W 72/048
USPC .......... 370/329, 330, 331, 280, 294, 281, 295
See application file for complete search history.

(56) References Cited

U.S. PATENT DOCUMENTS

| 8,553,593 | B2 * | 10/2013 | Lim | ................... | H04W 72/042 |
| | | | | | 370/281 |
| 2004/0032850 | A1 | 2/2004 | Marinier et al. | | |
| 2009/0196193 | A1 * | 8/2009 | Frenger | ............. | H04W 72/1242 |
| | | | | | 370/252 |

(Continued)

FOREIGN PATENT DOCUMENTS

| EP | 1229671 A2 | 8/2002 |
| WO | 2008054122 A1 | 5/2008 |

OTHER PUBLICATIONS

Chung, H., et al., "Time Slot Allocation Based on Region and Time Partitioning for Dynamic TDD-OFDM Systems," Vehicular Technology Conference, 2006. VTC 2006-Spring. IEEE 63rd. May 7-10, 2006. pp. 2459-2463. vol. 5. Melbourne, Victoria, Australia.

*Primary Examiner* — Chuong T Ho
(74) *Attorney, Agent, or Firm* — Murphy, Bilak & Homiller, PLLC

(57) ABSTRACT

The present invention relates to a scheduling apparatus (100) and a method for a cellular Time-Division Duplex (TDD) radio communication system (180). The apparatus comprises a storage unit configured for holding a database comprising topographical information concerning a geographical area covered by the communication system. The apparatus also comprises a position unit configured for obtaining information concerning a geographical position held by at least one of a first and a second radio communication device (120;160) of the communication system within said area. The apparatus further comprises a scheduling unit configured for allocating a communication time slot as an uplink time slot or a downlink time slot for radio communication between a first base station (110) and said first device (120) of the communication system. Whether the time slot is allocated as an uplink time slot or a downlink time slot is dependent on said position information and on said topographical information.

19 Claims, 4 Drawing Sheets

(56) References Cited

U.S. PATENT DOCUMENTS

| | | | | |
|---|---|---|---|---|
| 2009/0323596 A1* | 12/2009 | Wigren | G01S 5/0226 | 370/329 |
| 2010/0069070 A1* | 3/2010 | Shi | H04W 36/32 | 455/436 |
| 2011/0013543 A1* | 1/2011 | Lim | H04W 72/042 | 370/281 |
| 2012/0099458 A1* | 4/2012 | Ezaki | H04W 72/0406 | 370/252 |
| 2014/0198765 A1* | 7/2014 | Krishnamurthy | H04L 5/0035 | 370/330 |

* cited by examiner

SCHEDULING APPARATUS AND METHOD FOR A TDD COMMUNICATION SYSTEM

TECHNICAL FIELD

The invention relates to scheduling of uplink and downlink time slots in a TDD communication system.

BACKGROUND

Time-Division Duplex (TDD) is the application of time-division multiplexing to separate uplink and downlink signals at the same frequency. Signalling is divided into time slots where some time slots are allocated for uplink and others are allocated for downlink communication It may thus emulate full duplex communication over a half duplex communication link.

Time division duplex is advantageous in the case where there is asymmetry of the uplink (UL) and downlink (DL) data rate transmission requirements or demands. As the amount of uplink data increases, more UL communication capacity can be dynamically allocated, and as the UL traffic load becomes lighter, UL capacity can be released and taken away. The same applies in the downlink direction.

For radio systems that aren't moving quickly, another advantage is that the uplink and downlink radio paths are likely to be very similar. This means that techniques such as beamforming based on radio channel reciprocity work well with TDD systems.

Examples of Time Division Duplexing systems include the following communication standards. UMTS 3G supplementary air interfaces TD-CDMA for indoor mobile telecommunications. The TD-LTE 4-G, TD-SCDMA 3-G mobile communications air interface. DECT wireless telephony. Half-duplex packet mode networks based on carrier sense multiple access, for example 2-wire or hubbed Ethernet, Wireless local area networks and Bluetooth, can be considered as Time Division Duplex systems, albeit not TDMA with fixed frame-lengths. IEEE 802.16 WiMAX and PACTOR.

A potential problem with TDD, since both uplink and downlink signalling occurs at the same frequency, is that radio communications which occur in close vicinity of each other between devices aimed for different communication links interfere with each other unless the communications use the same allocation of uplink and downlink time slots. For example, two mobile devices in the same area may interfere with each other if one transmits and the other tries to receive radio signals from another communication source at the same time.

EP 1 229 671 discloses time slot allocation in the CDMA-TDD scheme. A time slot of uplink is allocated to a mobile station in a cell. At the same time, a time slot of downlink, having the same time slot number as that of the foregoing time slot, is allocated to another mobile station in an adjacent cell, provided that the two mobile stations are distant from each other.

SUMMARY

It is an objective of the present invention to at least alleviate a problem with the prior art.

According to an aspect of the present invention, there is provided a scheduling apparatus for a cellular Time-Division Duplex (TDD) radio communication system. The apparatus comprises a storage unit configured for holding a database comprising topographical information concerning a geographical area covered by the communication system. The apparatus also comprises a position unit configured for obtaining information concerning a geographical position held by at least one of a first and a second radio communication device of the communication system within said area. The apparatus further comprises a scheduling unit configured for allocating a communication time slot as an uplink time slot or a downlink time slot for radio communication between a first base station and said first radio communication device of the communication system. The scheduling unit is configured such that whether the time slot is allocated as an uplink time slot or a downlink time slot is dependent on said position information and on said topographical information.

According to another aspect of the present invention, there is provided a scheduling apparatus for a cellular Time-Division Duplex (TDD) radio communication system. The apparatus comprises means for providing a database comprising topographical information concerning a geographical area covered by the communication system. The apparatus also comprises means for obtaining information concerning a geographical position held by at least one of a first and a second radio communication device of the communication system within said area. The apparatus further comprises means for allocating a communication time slot as an uplink time slot or a downlink time slot for radio communication between a first base station and said first radio communication device of the communication system. The scheduling unit is configured such that whether the time slot is allocated as an uplink time slot or a downlink time slot is dependent on said position information and on said topographical information.

According to another aspect of the present invention, there is provided a radio communication node comprising an apparatus of any of the aspects above According to another aspect of the present invention, there is provided a radio communication system. The system comprises a radio base station, a radio communication device or terminal, and a scheduling apparatus of any of the apparatus aspects above.

According to another aspect of the present invention, there is provided a method of a cellular Time-Division Duplex (TDD) radio communication system. The method comprises providing a database comprising topographical information concerning a geographical area covered by the communication system. The method also comprises obtaining information concerning a geographical position held by at least one of a first and a second radio communication device of the communication system within said area. The method further comprises allocating a communication time slot as an uplink time slot or a downlink time slot for radio communication between a first base station and said first radio communication device of the communication system. Whether the time slot is allocated as an uplink time slot or a downlink time slot is dependent on said position information and on said topographical information.

Any of the apparatus aspects of the present invention may be used for performing the method aspect of the present invention.

According to another aspect of the present invention, there is provided a computer program product comprising computer-executable components for causing an apparatus to perform the method of the method aspect above, when the computer-executable components are run on a processing unit included in the apparatus.

According to another aspect of the present invention, there is provided a computer program for a cellular Time-Division Duplex (TDD) radio communication system. The computer program comprises computer program code which, when run on an apparatus of the radio communication system, causes the apparatus to provide a database comprising topographical information concerning a geographical area covered by the communication system. The code also causes the apparatus to obtain information concerning a geographical position held by at least one of a first and a second radio communication device of the communication system within said area. The code further causes the apparatus to allocate a communication time slot as an uplink time slot or a downlink time slot for radio communication between a first base station and said first radio communication device of the communication system, wherein whether the time slot is allocated as an uplink time slot or a downlink time slot is dependent on said position information and on said topographical information.

According to another aspect of the present invention, there is provided a computer program product comprising a computer program according to the aspect above, and a computer readable means on which the computer program is stored.

It is an advantage of the present invention that a time slot may be allocated as an uplink or downlink time slot depending on topographical information. This may be very useful in order to prevent interference between radio communication devices due to differing uplink/downlink allocation of time slots for the different radio communication devices, while still allowing increased flexibility in uplink/downlink allocation if the topography is such that the interference may be kept at an acceptable level.

The discussions above and below in respect of any of the aspects of the invention are also in applicable parts relevant to any other aspect of the present invention.

The position information may be for said first radio communication device. In this embodiment of the present invention, the scheduling apparatus may obtain the position information regarding the same device/terminal as for which the allocation is done. The position information may then be obtained e.g. via the first base station, possibly as part of the radio communication between the first base station and the first device. Position information relating to the first device may often be relevant to assess any interference between said first device and any other radio communication device, separate from said first device.

The position unit may be configured for obtaining information concerning geographical positions held by both the first and second radio communication devices. In this embodiment, position information may be obtained for two separate radio communication devices. This may e.g. facilitate assessing any interference between the two radio communication devices.

The second radio communication device may be connected to a second base station, the second base station being separate from said first base station. In this embodiment, assessing any interference between two radio communication devices, such as two terminals, connected to/associated with different base stations, may be facilitated. The scheduling apparatus may thus be able to communicate with both the first and second base stations.

The scheduling unit may be configured for correlating the obtained position information of the first radio communication device and obtained position information of the second radio communication device with the topographical information. The scheduling unit may further be configured for estimating, based on said correlation, any risk for interference between said first and second devices if the allocation of time slot is changed from uplink to downlink or vice versa. In this embodiment, the topographical information as well as the position information of both the first and second devices are used in assessing any interference between said devices. Specifically, interference may arise if a time slot allocation is changed. The time slot allocation for the devices may e.g. have earlier been correlated with each other (e.g. be the same for each time slot) in order to avoid interference, and changing the allocation for a time slot for only one of the devices may thus risk leading to interference, depending on the relative positions of the devices and the topography of the area.

The scheduling apparatus may be a separate device of the radio communication system, or it may be integrated in another device. It may be convenient to integrate the scheduling apparatus in the first base station, and/or in the second base station if there is a second base station. If the scheduling apparatus is integrated in the first base station, it may e.g. more easily obtain position information from the first device with which it is associated/connected. Alternatively, it may be convenient to have the scheduling apparatus, or at least a part of the scheduling apparatus (such as the storage unit) as a separate unit which may e.g. be able to communicate with a plurality of base stations for obtaining, and possibly giving, information for radio communication devices connected to different base stations. The scheduling apparatus may be comprised e.g. in any communication node of the communication system, such as in a base station, but also, or alternatively, in e.g. an RNC node or positioning node.

The scheduling apparatus may further comprise a quality unit configured for obtaining signal quality information of the radio communication between the second radio communication device and its associated base station and updating the database held by the storage unit with said signal quality information. The updated database may then be used as base for more precise interference assessments in the future. Additionally, the quality unit may be configured for associating said obtained signal quality information with the position information in the database This may e.g. facilitate obtaining an indication of the interference of the communication between the first base station and the first radio communication device in view of the position information of the first radio communication device and the topographic information.

The scheduling apparatus may further comprise a quality unit configured for obtaining signal quality information of the radio communication between the first base station and the first radio communication device and updating the database held by the storage unit with said signal quality information. The updated database may then be used as base for more precise interference assessments in the future. Additionally, the quality unit may be configured for associating said obtained signal quality information with the position information in the database This may e.g. facilitate obtaining an indication of the interference of the communication between the first base station and the first radio communication device in view of the position information of the first radio communication device and the topographic information.

The position information may be any type of position information relating to the geographical position of the at least one of the first and the second radio communication devices, e.g. coordinates of the geographical position or one or a plurality of distances from the geographical position to one or a plurality of other (known) positions. Position information may e.g. originate from a GPS functionality integrated in the first or the second radio communication device or from triangulation operations between a plurality of radio communication devices (at the earth surface). Thus, position information of the at least one of the first and the second radio communication devices may e.g. comprise Global Positioning System (GPS) information or position information based on positioning pilots transmitted from a base station for the radio communication device.

The obtaining of position information in the method aspect of the present invention may comprise requesting the position information from the at least one of the first and the second radio communication device, and receiving the position information from said at least one of the first and the second radio communication device. As discussed above, the position information may in accordance with this embodiment be obtained from the radio communication device itself, instead of e.g. from other devices of the communication system and associated with the first radio communication device.

The allocating in the method aspect of the present invention may comprise correlating obtained position information of the first radio communication device with the topographical information of the database. The allocating may also comprise correlating obtained position information of the second radio communication device with the topographical information of the database. The allocating may further comprise estimating any risk for interference between said radio communication devices based on said correlation. The allocating may then comprise assigning the communication time slot as an uplink time slot or a downlink time slot depending on said estimated risk for interference. As discussed above, it may be advantageous to assess/estimate any interference between two radio communication devices based on position information for said devices and the topographical information available for the area, and use this as basis for a decision on whether to allocate a time slot as uplink or downlink.

As discussed above, it may be advantageous to update the database with information about actual signal quality within the communication system. Thus the method aspect of the present invention may comprise obtaining signal quality information of radio communication between the first base station and the first radio communication device and/or between the second radio communication device and its associated base station.

The method may also comprise linking said signal quality information to said position information. The method may further comprise updating the database with said signal quality information linked to said position information.

The present invention may e.g. be useful if there is an higher need for uplink or downlink time slots for transmitting bits of communications then are currently allocated, and there is a lower need for time slots for bit transmission in the opposite direction (downlink or uplink) than allocated. If e.g. a radio communication device has a relatively full buffer for bits for uplink transmission, it may send a request to the scheduling apparatus for additional (possibly extraordinary) uplink time slots. Thus the method aspect of the present invention may comprise receiving an indication from said first radio communication device that additional allocation of uplink time slots or downlink time slots is desired, whereby the allocating of a communication time slot may additionally be dependent on the received indication from said device.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
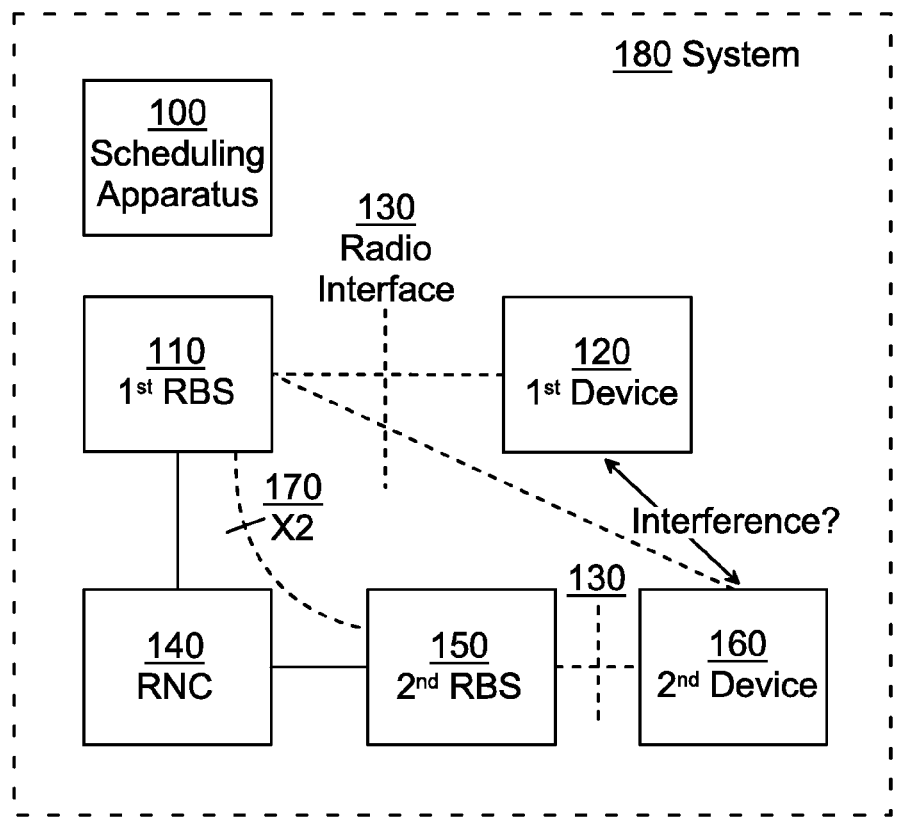
FIG. 1 is a schematic box diagram of an embodiment of a radio communication system of the present invention.

FIG. 1 schematically illustrates a cellular TDD radio communication system 180 of the present invention.

The TDD radio communication system 180 discussed herein may be in accordance with any wireless TDD communication standard, and may conveniently be used for e.g. Time-Division Code Division Multiple Access (TD-CDMA), Time-Division Synchronous Code Division Multiple Access (TD-SCDMA) or TDD mode of LTE communication standards. The radio communication devices or terminals 120 & 160 and base stations 110 & 150, discussed herein may thus be configured for any such communication standard.

Disclosed in FIG. 1 are a first radio base station (RBS) 110 and a second RBS 150. Of course, almost any number of RBSs may be comprised in the system 180, but in the figure only two are shown in order to simplify the figure. Similarly, a first radio communication device 120 and a second radio communication device 160 are shown, but a person skilled in the art will realise that almost any number of devices may be comprised in the system, and that several devices may be connected to the same RBS at the same time. The first and/or the second RBS 110 & 150 may e.g. be a Node B or an evolved Node B, or any other base station of a 2G, 3G, 4G or future radio communication standard. Similarly, the first and/or the second device or terminal 120 & 160 may be configured for any 2G, 3G, 4G or future radio communication standard. The first and/or the second device or terminal 120 & 160 may e.g. be a mobile phone or a portable computer.

Depending on the communication standard of the system 180, e.g. if the system is in accordance with a Universal Mobile Telecommunications System (UMTS) standard, the first and/or second RBSs 110 & 150 may be connected to a Radio Network Control (RNC) node 140. Additionally or alternatively, e.g. if the system is in accordance with a Long Term Evolution (LTE) standard, the RBSs of the system 180 may communicate with each other over an X2 interface 170.

The radio communication devices (or "devices" for short) 120 & 160 discussed herein may alternatively be called terminals, each device communicating with an RBS over a radio interface 130. They may thus at least in theory interfere (radio interference) with each other. In a TDD system, typically, devices may interfere with each other if their uplink and downlink allocations are not synchronised with each other. There may also be a risk of RBSs interfering with each other in the same way. Thus, all devices connected to the same RBS and possibly to any neighbouring RBS(s) may have identical allocations of uplink and downlink time slots such that any time slot with a certain number has the same allocation (uplink or downlink) for all devices. As mentioned above, this may limit the flexibility of the system and the time slots may not be used optimally since some devices may have need for more time slots for uplink or downlink signalling than other devices. However, not all devices in an area covered by the system 180, not even all devices connected to the same RBS, may actually be interfering with each other if the allocations are not synchronised (identical). Whether or not interference will actually occur may depend on many things. One such thing is the geographical positions of the devices which may, or may not, interfere with each other. If the devices are close to each other, the risk of interference is generally greater than if they are remote from each other. If at least one of the devices is close to the RBS to which it is connected, the risk of interference may be generally reduced since communication may then be conducted at a lower power level, thereby reducing the risk of causing interference. Another thing is how well shielded the radio signals are. Beamforming may e.g. be used to reduce the risk of causing interference, but shielding may also be achieved by the topography of the surroundings where the devices and RBSs are located. If, e.g., there is a massive house or ridge located between the two devices, the risk of interference between the devices may be reduced compared with if there is a line of sight between them. Similarly, if at least one of the devices is indoors, the risk of interference may be reduced. The present invention may be particularly convenient in an urban environment. As noted above, interference may similarly occur between RBSs.

The system 180 of the embodiment shown in FIG. 1 also comprises a scheduling apparatus 100. The scheduling apparatus is tasked with allocating time slots for signalling between at least one device and at least one RBS, deciding whether at least one time slot should be allocated for uplink or downlink. In FIG. 1 the apparatus 100 is drawn as a separate unit in the system 180. However, it may be convenient to, fully or partly, integrate it in a communication node of the system 180, preferably in a node responsible for time slot allocation. Which node that is generally responsible for time slot allocation may differ depending on the communication standard, but may e.g. be an RNC node 140 or an RBS 110 & 160. There may be more than one scheduling apparatus 100 in the system 180, e.g. one in each of the RBSs 110 & 150. In some embodiments only some parts of the apparatus 100 may be integrated in a communication node, while other part(s) e.g. a storage unit (server) may be separate, possibly servicing a plurality of communication nodes.

Figure 2:
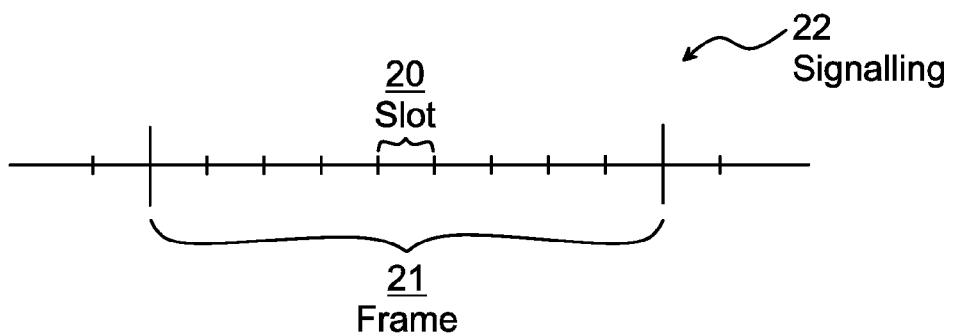
FIG. 2 is a schematic illustration of radio signalling of a TDD communication, divided into frames and time slots.

FIG. 2 is a schematic illustration of radio signalling or communication 22 between a device and an RBS in a TDD system 180. The time duration of the signalling 22 is divided into time slots 20, each of which may be allocated as an uplink time slot or a downlink time slot. There may also be time slots which are not allocated, not used for signalling in either direction. A time slot may be defined differently and called different things in different communication standards. In LTE it may e.g. be called a sub-frame. In the present disclosure the term "time slot" should be interpreted broadly, covering any time period which may be allocated for either uplink or downlink radio signalling. Depending on the communication standard, a plurality of consecutive time slots may form a frame 21.

Figure 3:
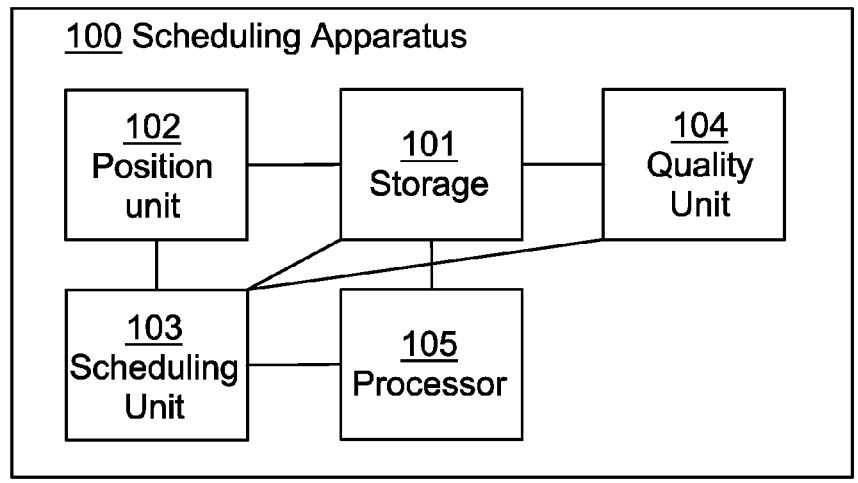
FIG. 3 is a schematic box diagram of a an embodiment of a scheduling apparatus of the present invention.

FIG. 3 schematically illustrates an embodiment of a scheduling apparatus 100 of the present invention.

The scheduling apparatus 100 comprises a storage unit 101 configured for holding a database comprising topographical information of at least part of the geographical area covered by the communication system 180. The storage unit may be any suitable storage unit, such as a hard disk or solid state hard drive, e.g. in the form of a server connected in the communication system 180 or integrated in a communication node of the system. In order to facilitate access of a plurality of system nodes to the data base, it may be convenient with the storage unit in the form of a server integrated or not integrated with other parts of the apparatus 100 discussed herein.

The scheduling apparatus 100 comprises a position unit 102 configured for obtaining information concerning a geographical position held by a radio communication device of the communication system 180 within the area covered by the communication system. As discussed above, the position unit 102 may be configured to obtain the information by means of e.g. GPS and/or positioning nodes. The obtained information may give an indication of where the radio communication device is. The device may e.g. be one of the devices 120 and 160, but it may alternatively be the second RBS 150. An objective of the position unit 102 is to obtain and provide position information which in combination with topographical information in the database of the storage unit 101 may form the basis for whether a time slot 20 in the communication between the first device 120 and the first RBS 110 is allocated for uplink or downlink, possibly changing a previous (standard) allocation of said time slot 20. As with any other part of the apparatus 100, the position unit 102 may be integrated in a system node, such as an RBS 110 or RNC 140 and/or integrated with other parts of the apparatus 100 e.g. the storage unit 101, or be a separate unit in the system 180. The position unit 102 may comprise or be otherwise associated with a processing unit 105 for assisting in the obtaining and presentation of the position information.

The scheduling apparatus 100 comprises a scheduling unit 103 configured for allocating a communication time slot 20 as an uplink time slot or a downlink time slot for radio communication between a first base station 110 and a first radio communication device 120 of the communication system 180. As discussed herein, whether the time slot 20 is allocated as an uplink time slot or a downlink time slot is dependent on said position information and on said topographical information. If e.g. the risk of substantial interference caused by allocating the time slot 20 as an uplink time slot instead of a downlink time slot, which is how the time slot may be allocated as standard, is estimated by the scheduling unit 103 to be small, then said scheduling unit 103 may go ahead and change the time slot allocation from downlink to uplink. In deciding whether the interference is substantial or not, the quality of service requirements of the respective signallings which may interfere with each other may be considered. The risk may be estimated in view of the position information for the first radio communication device in combination with the topographical information, e.g. the first radio communication device may be indoor, reducing its ability to interfere with other radio communication devices as well as reducing the risk of being interfered with by other radio communication devices. The scheduling unit 103 may e.g. obtain position information from the position unit 102 and topographical information from the storage unit 101 for forming a basis for the allocation and any risk estimation. As with any other part of the apparatus 100, the scheduling unit 103 may be integrated in a system node, such as an RBS 110 or RNC 140 and/or integrated with other parts of the apparatus 100 e.g. the storage unit 101, or be a separate unit in the system 180. The scheduling unit 103 may comprise or be otherwise associated with a processing unit 105 e.g. for assisting in the allocation and any risk estimation.

The scheduling apparatus 100 may further comprise a quality unit 104 configured for obtaining signal quality information of the radio communication between the second device 160 and its associated RBS 110 or 150, and/or between the first base station 110 and the first device 120. The database held by the storage unit 101 may then be updated with said signal quality information by means of said quality unit 104. By obtaining information about the signal quality, the real interference may be measured. This information in the updated database may thus improve the accuracy of future risk estimations and improve the basis for the allocation by the scheduling unit 103. The scheduling unit may thus also obtain this information, either from the updated database or directly from the quality unit prior to allocation of the time slot. As with any other part of the apparatus 100, the quality unit 104 may be integrated in a system node, such as an RBS 110 or RNC 140 and/or integrated with other parts of the apparatus 100 e.g. the storage unit 101, or be a separate unit in the system 180. The quality unit 104 may e.g. be integrated with or cooperate with a regular signal quality measuring functionality in e.g. one or several RBS(s), and thus be integrated in an RBS. It should be noted that a plurality of quality units 104 in the system 180 may be associated with the same storage unit 101 and the database therein, and the same may be true e.g. for the position unit 102 and/or the scheduling unit 103. The quality unit 104 may comprise or be otherwise associated with a processing unit 105 e.g. for assisting in the obtaining of signal quality information.

As mentioned above, the scheduling apparatus 100 may comprise one or more processing unit(s) 105. The processing unit 105 may e.g. be a CPU in the form of microprocessor(s) executing appropriate software stored in associated memory, e.g. in the storage unit 101, for procuring required functionality such as for performing the method of the present invention. However, other suitable devices with computing capabilities could be used for the processing unit 105, e.g. an application specific integrated circuit (ASIC), a field programmable gate array (FPGA), a complex programmable logic device (CPLD), or the like.

Figure 4:
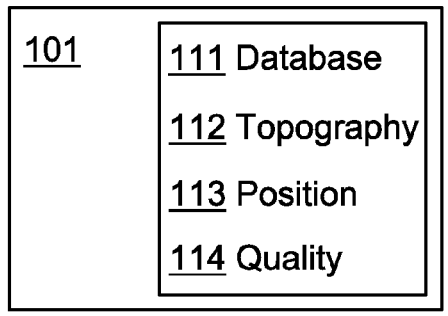
FIG. 4 is a schematic box diagram of an embodiment of a storage unit of the present invention.

FIG. 4 is a schematic illustration of an embodiment of the storage unit 101, e.g. in the form of a server. The storage unit is configured for holding a database 111 in any suitable form. The storage unit and the database may be configured to allow suitable other parts of the scheduling apparatus 100, such as the position unit 102, the quality unit 104, the scheduling unit 103 and/or the processing unit 105, to access the storage unit and the database therein for extracting information therefrom and/or for writing information thereto (updating the database). As discussed above, the database may be configured for holding topographical information 112 relating to at least a part of the geographical area covered by the communication system 180. The topographical information may e.g. be digital topographical survey maps over the area. Optionally, the database 111 may be configured for holding position information 113, e.g. obtained by the position unit 102, relating to one or a plurality of geographical positions held by one or a plurality of radio communication devices, such as devices and/or RBSs within the area covered by the communication system 180. Optionally, the database 111 may be configured for holding quality information 114, e.g. obtained by the quality unit 104, relating to signal quality in communication(s) between device(s) and respective RBS(s) within the area covered by the communication system 180. The quality information may e.g. comprise signal-to-noise ratios, bit error rates and/or packet error rates. It may be convenient to collect position information relating to a radio communication device, linked to quality information relating to signalling involving this same device while in the position as indicated by the position information. From such linked information it may then be possible to better estimate interference (signal quality deterioration) for devices in the same position or in the vicinity of that position. By updating the database continuously, future allocation decisions may be at least partly based on, and improved by, past allocation decisions. Also the topographical information 112 may need to be updated occasionally, e.g. in order to account for new buildings and such. It is conceivable that the data base 111 may be divided, or duplicated, on a plurality of storage units 101. The topographical information may e.g. be held in one storage unit, e.g. a central server, whereas the position and/or quality information is held, and updated, in other storage unit(s), e.g. integrated in a system node.

Figure 5:
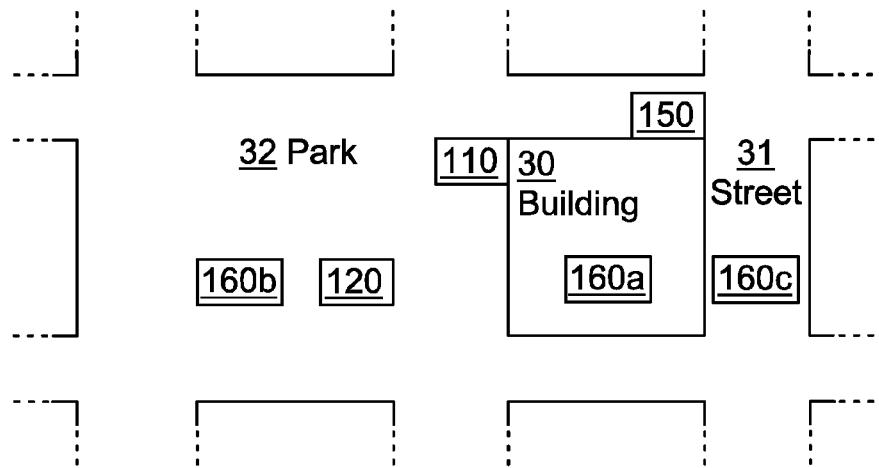
FIG. 5 is a schematic plan view of a of a city block and its surroundings in which embodiments of the present invention may be used.

FIG. 5 is a schematic illustration of a plan view of an urban environment comprising building blocks 30, streets 31 and a park 32. A first RBS 110 is arranged on a park facing façade of a building 30, and a second RBS 150 is arranged on another façade of the building 30, around a corner of the building from the first RBS 110. A first communication device 120, e.g. a mobile phone, is located in a the park 32 outside the building 30. In this exemplary case, there are three second communication devices 160. A second device 160a is located inside the building 30, a second device 160b is located in the park 32 and a second device 160c is located on a street 31 on the opposite side of the building 30 as seen from the park 32. Any of the second devices 160 may be connected to the first RBS and any other of the second devices 160 may be connected to the second RBS 150. If the present invention is applied to the communication system 180 which comprises the first and second RBSs as well as the first and second devices shown in FIG. 5, the database 111 may comprise topographical information 112 which may let the scheduling apparatus 100 know where there is a building 30 and where there is a park 32 etc. within the area covered by the communication system 180.

Consider the situation where there is on-going radio signalling between the first device 120 and the first RBS 110 to which it is connected. For instance, the first device 120 may have filled its buffer for bits to send uplink and requests an extra allocation of uplink time slots from the apparatus 100 in its communication with the first RBS 110. The first device 120 may e.g. need an UL/DL allocation of 6/4 instead of an UL/DL allocation of 4/6 used in the system 180 as standard. In respect of possible interference with the second device 160a, the scheduling apparatus may obtain position information for the second device 160a via the RBS 110 or 150 to which it is connected, possibly via an RNC node 140 or an X2 interface 170, depending on the communication standard and where the apparatus 100 is located. The second device 160a may e.g. be ordered to turn on its GPS function (if not already on) and obtain GPS coordinates for its position and send them to the apparatus 100. The apparatus 100 may then, based on the position information in view of the topographical information, come to the conclusion that the second device is inside the building 30 and that it may thus be a low likelihood of it interfering with, or it being interfered by, a change in allocation for a time slot in the signalling between the first device 120 and the first RBS 110. The apparatus 100 may then decide to allocate the time slot as uplink. Optionally, the apparatus 100 may also obtain position information for the first device 120 in order to determine that it is not also inside the building 30, possibly in the same room as the second device 160a, before changing the allocation of the time slot. Similarly, if position information is first obtained for the first device 120, the apparatus may find that said first device is located in the park 32 (not much radio shielding) why it may not be appropriate to change the allocation of the time slot, at least not without first determining whether there are other terminals in the park. If the first device 120 had been in a building 30, the apparatus might have instead determined that it would be ok to change allocation without further investigation into other device positions. With the same reasoning, the apparatus 100 may determine that it is ok to change the allocation in view of the second device 160c after having obtained position information concerning both the first device 120 and the second device 160c since they are on opposite sides of the building 30, but that it may not be ok to change allocation in view of the second device 160b since it is located in the same park 32 as the first device 120. As mentioned above, there may also sometimes be a risk of interference between RBSs. Thus, position information for the second RBS 150 may additionally or alternatively be obtained. Based on position information for the second RBS 150 in view of the topographical information, the apparatus 100 may decide whether there is a risk of interference between the two RBSs 110 and 150 and thus whether it should change the allocation of the time slot in the signalling between the first RBS 110 and the first device 120. After having changed the allocation, the apparatus may collect signal quality information, regarding the signalling between the first device 120 and the first RBS 110 and/or regarding signalling between any of the second devices 160 and its respective RBS (first or second RBS). This quality information may show whether the changed allocation did give rise to any significant interference or not, and thus whether it was ok to make the allocation change. This quality information 114 may then be stored in the database 111 for future reference, as discussed above.

In some embodiments of the present invention, the position information for the first device 120 may be related to cell borders or other hypothetical entities, instead of or in addition to second device(s) 160, in order to e.g. estimate risk of interference with devices of other cells than the cell of the first RBS 110.

In some embodiments of the present invention, the apparatus 100 may change the allocation of the time slot 20, but may additionally impose a restriction on the transmission power for said time slot in order to reduce the risk of causing interference.

In some embodiments of the present invention, the apparatus 100 or other parts of the system 180 may request second devices 160, which may be at risk of being interfered by an allocation change for the first device 120, to measure and report its received signal strength from the first device 120, before the apparatus decides whether to change the allocation of the time slot.

Of course, in some embodiments of the present invention, the allocation may be changed for more than one time slot 20. The general time slot allocation for the first device 120 may be changed, e.g. until the device 120 requests that the extra allocation is discontinued, during a predetermined time period, for as long as the first RBS 110 does not need to discontinue the extra allocation in view of its own signalling needs, or the like. An UL/DL allocation of 6/4 instead of an UL/DL allocation of 4/6 may e.g. be used. The first device 120 may be informed of the possibility of using extra UL time slots 20, and the first RBS (or e.g. RNC) starts to transmit UL grants valid for the extra time slots.

Figure 6:
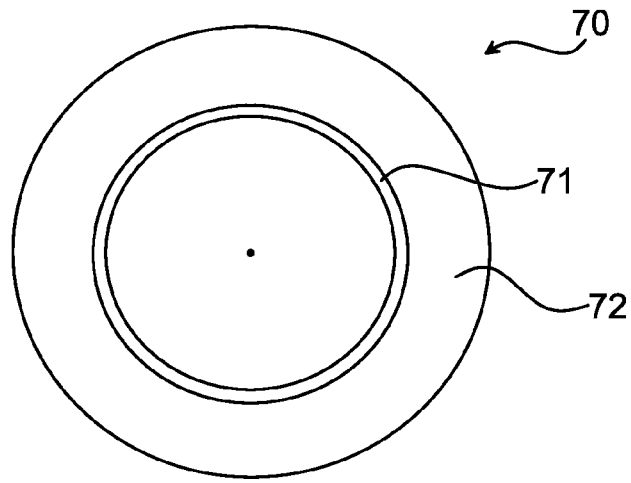
FIG. 6 is a schematic illustration of an embodiment of a computer program product of the present invention.

FIG. 6 schematically illustrates a computer program product 70 comprising a computer readable medium 72 and a computer program 71 in the form of computer-executable components 71. The computer program/computer-executable components may be configured to cause a scheduling apparatus 100, e.g. as discussed above, for a TDD radio communication system 180 to perform an embodiment of the method of the present invention. The computer program/computer-executable components may be run on the processing unit 105 of the apparatus 100 for causing the apparatus to perform the method. The computer program product 70 may e.g. be comprised in a storage unit 101 or memory comprised in the apparatus 100 and associated with the processing unit 105. Alternatively, the computer program product 70 may be, or be part of a separate, e.g. mobile, storage means, such as a computer readable disc, e.g. CD or DVD or hard disc/drive, or a solid state storage medium, e.g. a RAM or Flash memory.

Figure 7:
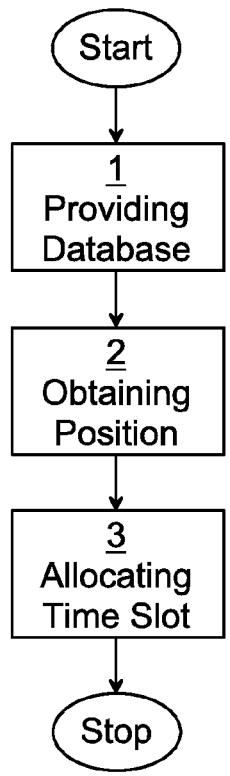
FIG. 7 is a schematic flow chart of an embodiment of a method of the present invention.

FIG. 7 is a schematic flow chart of an embodiment of a method of the present invention. A database 111 is provided (step 1), e.g. in the storage unit 101 as discussed above. The database 111 comprises topographical information 112 concerning a geographical area covered by the communication system 180. Position information 113 is obtained (step 2), e.g. by the position unit 102 as discussed above. The position information concerns a geographical position held by a radio communication device 120; 150; 160 of the communication system 180 within the area covered by the communication system. It should be noted that the obtaining step 2 may be performed before, after or simultaneously as the providing step 1. A communication time slot 20 is allocated (step 3), e.g. by means of the scheduling unit 103 as discussed above, as an uplink time slot or a downlink time slot for radio communication between a first base station 110 and a first device 120 of the communication system 180, wherein whether the time slot 20 is allocated 3 as an uplink time slot or a downlink time slot is dependent on said position information 113 and on said topographical information 112. Reference is also made to the discussions in respect of other figures herein.

Figure 8:
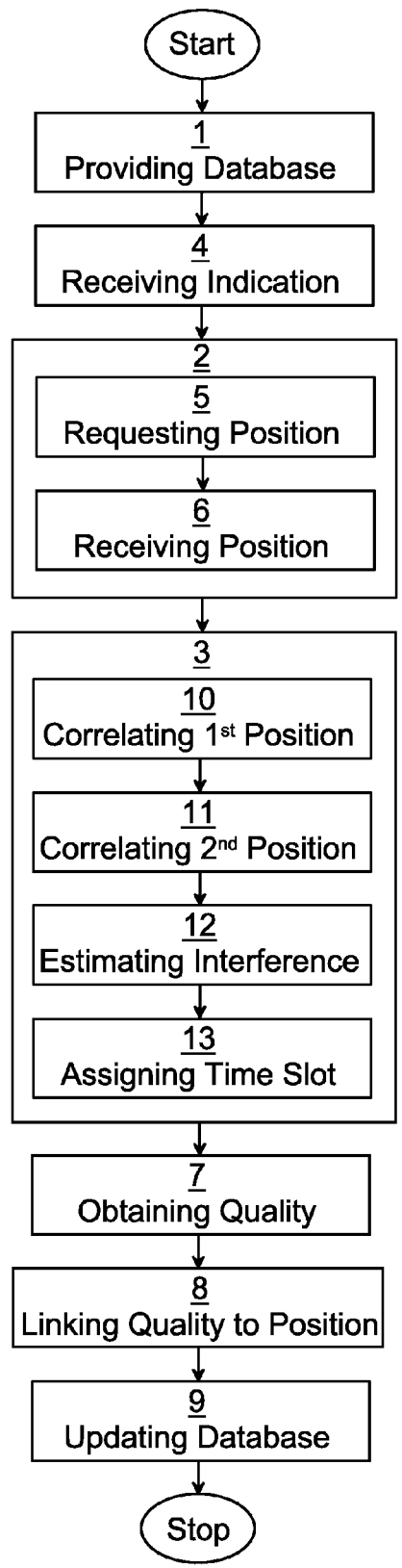
FIG. 8 is a schematic flow chart of another embodiment of a method of the present invention.

FIG. 8 is a schematic flow chart of another embodiment of a method of the present invention.

In addition to the method steps discussed in respect of FIG. 7, the method may comprise receiving 4 an indication from said first device 120 that additional allocation 3 of uplink time slots 20 or downlink time slots 20 is desired. As discussed above, this may e.g. be prompted when a send buffer of the first device 120 has reached a certain level. Then, the allocating 3 of a communication time slot 20 may additionally be dependent on the received 4 indication, e.g. such that the apparatus 100 is prompted to consider changing an allocation of the time slot from a downlink (DL) allocation to an uplink (UL) allocation. Possibly, at least one way in which the inventive method may be activated (at least step 3 discussed above) is by the apparatus 100 receiving such a request from the first device 120.

In addition to the method steps discussed in respect of FIG. 7, the method may comprise obtaining 7 signal quality information 114 of the radio communication between the first base station 110 and the first device 120. The signal quality information may then be linked 8 with relevant position information 113, i.e. position information for at least one of the radio communication devices partaking in the communication (the first device 120 and the first RBS 110). The position information 113 to which the quality information 114 is linked may preferably be position information for the first device 120. As mentioned above, the database 111 may then be updated 9 with said signal quality information 114 linked 8 to said position information 113. The obtaining 7 of quality information 114 may e.g. be done prior to the allocating 3, e.g. to allow the signal quality to be yet another parameter to consider when deciding the allocation of the time slot 20. However, it may be convenient to obtain 7 the quality information after the allocating 3, in order to see whether any significant interference was created by the allocating 3 in the communication. This information 114, possibly in the updated database, may then be used as reference for future allocating 3. It is also conceivable to obtain 7 quality information 114 both before and after the allocating 3.

In some embodiments, the obtaining 2 of position information 113 may comprise requesting 5 the position information 113 from the first radio communication device; and receiving 6 the position information 113 from said first radio communication device. If the radio communication device, e.g. the first or second devices 120 & 160, comprises a GPS function, the requesting 5 may comprise a request for GPS coordinates of the geographical position currently held by the radio communication device to be obtained by the radio communication device and to be sent back to the apparatus 100 or other node of the system 180. This is a way of obtaining 2 the position information. 113.

In some embodiments, the allocating 3 a time slot may comprise correlating 10 the obtained 2 position information 113 of the first radio communication device with the topographical information 112 of the database 111. It may e.g. be noted whether the first radio communication device is located e.g. in a building 30 or in a park 32, as discussed above. The allocating 3 may also comprise correlating 11 obtained 2 position information 113 of at least one second radio communication device 120; 150; 160 with the topographical information 112 of the database 111. The second radio communication device may be any radio communication device that may be at risk of interfering with or be interfered by the first radio communication device if their respective time slot allocations are not the same (synchronised). Then, the allocating 3 may comprise estimating 12 any risk for interference between said radio communication devices based on said correlation 11. In this embodiment, the allocating 3 may be concluded by assigning 13 the communication time slot 20 as an uplink time slot or a downlink time slot depending on said estimated 12 risk for interference.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A scheduling apparatus for a cellular Time-Division Duplex, TDD, radio communication system, the apparatus comprising:
    a storage unit configured for holding a database comprising topographical information concerning a geographical area covered by the communication system;
    a position unit configured for obtaining information concerning a geographical position held by at least one of a first and a second radio communication device of the communication system within said area; and
    a scheduling unit configured for allocating a communication time slot as an uplink time slot or a downlink time slot for radio communication between a first base station and said first radio communication device of the communication system, wherein whether the time slot is allocated as an uplink time slot or a downlink time slot is dependent on said position information and on said topographical information.

2. The apparatus of claim 1, wherein said position unit is configured for obtaining information concerning geographical positions held by both the first and second radio communication devices.

3. The apparatus of claim 2, wherein the scheduling unit is configured for correlating the obtained position information of the first radio communication device and the obtained position information of the second radio communication device with the topographical information, and for estimating, based on said correlation, any risk for interference between said first and second devices if the allocation of time slot is changed from uplink to downlink or vice versa.

4. The apparatus of claim 1, wherein said second radio communication device is connected to a second base station, the second base station being separate from said first base station.

5. The apparatus of claim 1, wherein the scheduling apparatus is integrated in the first base station.

6. The apparatus of claim 1, further comprising a quality unit configured for obtaining signal quality information of the radio communication between the second radio communication device and its associated base station and updating the database held by the storage unit with said signal quality information.

7. The apparatus of claim 1, further comprising a quality unit configured for obtaining signal quality information of the radio communication between the first radio communication device and the first base station and updating the database held by the storage unit with said signal quality information.

8. The apparatus of claim 1, wherein said position information of the at least one of the first and the second radio communication devices comprises Global Positioning System, GPS, information or position information based on positioning pilots transmitted from a base station for the radio communication device.

9. The apparatus of claim 1, wherein the apparatus is comprised in a radio communication node.

10. The apparatus of claim 1, wherein the apparatus is comprised in a base station or a Radio Network Control, RNC, node.

11. A scheduling apparatus for a cellular Time-Division Duplex, TDD, radio communication system, the apparatus comprising:
    means for providing a database comprising topographical information concerning a geographical area covered by the communication system;
    means for obtaining information concerning a geographical position held by at least one of a first and a second radio communication device of the communication system within said area; and
    means for allocating a communication time slot as an uplink time slot or a downlink time slot for radio communication between a first base station and said first radio communication device of the communication system, wherein whether the time slot is allocated as an uplink time slot or a downlink time slot is dependent on said position information and on said topographical information.

12. A radio communication system comprising:
    one or more radio base stations configured for communicating with radio communication devices; and a scheduling apparatus comprising:
- a storage unit configured for holding a database comprising topographical information concerning a geographical area covered by the radio communication system;
- a position unit configured for obtaining information concerning a geographical position held by at least one of a first and a second radio communication device within said area; and
- a scheduling unit configured for allocating a communication time slot as an uplink time slot or a downlink time slot for radio communication between a first one of said one or more radio base stations and said first radio communication device, wherein whether the time slot is allocated as an uplink time slot or a downlink time slot is dependent on said position information and on said topographical information.

13. A method of a cellular Time-Division Duplex, TDD, radio communication system, the method comprising:
- providing a database comprising topographical information concerning a geographical area covered by the communication system;
- obtaining information concerning a geographical position held by at least one of a first and a second radio communication device of the communication system within said area; and
- allocating a communication time slot as an uplink time slot or a downlink time slot for radio communication between a first base station and said first radio communication device of the communication system, wherein whether the time slot is allocated as an uplink time slot or a downlink time slot is dependent on said position information and on said topographical information.

14. The method of claim 13, wherein said obtaining position information comprises:
- requesting the position information from the at least one of the first and the second radio communication devices; and
- receiving the position information from said at least one of the first and the second radio communication devices.

15. The method of claim 13, wherein said allocating comprises:
- correlating obtained position information of the first radio communication device with the topographical information of the database;
- correlating obtained position information of the second radio communication device with the topographical information of the database;
- estimating any risk for interference between said radio communication devices based on said correlation; and
- assigning the communication time slot as an uplink time slot or a downlink time slot depending on said estimated risk for interference.

16. The method of claim 13, further comprising:
- obtaining signal quality information of radio communication between the second radio communication device and its associated base station;
- linking said signal quality information to said position information; and
- updating the database with said signal quality information linked to said position information.

17. The method of claim 13, further comprising:
- obtaining signal quality information of the radio communication between the first radio communication device and the first base station;
- linking said signal quality information to said position information; and
- updating the database with said signal quality information linked to said position information.

18. The method of claim 13, further comprising:
- receiving an indication from said first radio communication device that additional allocation of uplink time slots or downlink time slots is desired; and
- said allocating of a communication time slot additionally being dependent on the received indication.

19. A non-transitory computer-readable means storing a computer program for a cellular Time-Division Duplex, TDD, radio communication system, the computer program comprising computer program code which, when run on an apparatus of the radio communication system, causes the apparatus to:
- provide a database comprising topographical information concerning a geographical area covered by the communication system;
- obtain information concerning a geographical position held by at least one of a first and a second radio communication device of the communication system within said area; and
- allocate a communication time slot as an uplink time slot or a downlink time slot for radio communication between a first base station and the first radio communication device of the communication system, wherein whether the time slot is allocated as an uplink time slot or a downlink time slot is dependent on said position information and on said topographical information.

* * * * *